United States Patent
Barbastathis et al.

(10) Patent No.: US 9,256,202 B2
(45) Date of Patent: Feb. 9, 2016

(54) SYSTEM, METHOD AND APPARATUS FOR PHASE-CODED MULTI-PLANE MICROSCOPY

(75) Inventors: George Barbastathis, Boston, MA (US); Yuan Luo, Taipei (TW)

(73) Assignee: Massachusetts Institute of Technology, Cambridge, MA (US)

(*) Notice: Subject to any disclaimer, the term of this patent is extended or adjusted under 35 U.S.C. 154(b) by 45 days.

(21) Appl. No.: 13/476,768

(22) Filed: May 21, 2012

(65) Prior Publication Data
US 2012/0327490 A1    Dec. 27, 2012

Related U.S. Application Data

(60) Provisional application No. 61/488,344, filed on May 20, 2011.

(51) Int. Cl.
| | |
|---|---|
| G03H 1/10 | (2006.01) |
| G03H 1/12 | (2006.01) |
| G02B 5/32 | (2006.01) |
| G03H 1/00 | (2006.01) |
| G03H 1/02 | (2006.01) |
| G03H 1/22 | (2006.01) |
| G03H 1/28 | (2006.01) |
| G03H 1/26 | (2006.01) |

(52) U.S. Cl.
CPC ............ *G03H 1/0005* (2013.01); *G02B 5/32* (2013.01); *G03H 1/0248* (2013.01); *G03H 1/2286* (2013.01); *G03H 1/28* (2013.01); *G03H 2001/2675* (2013.01)

(58) Field of Classification Search
None
See application file for complete search history.

(56) References Cited

U.S. PATENT DOCUMENTS

| | | | |
|---|---|---|---|
| 3,636,248 A * | 1/1972 | Korpel | 367/8 |
| 4,942,112 A | 7/1990 | Monroe et al. | |
| 5,966,243 A * | 10/1999 | Braunecker et al. | 359/642 |
| 6,495,818 B1 | 12/2002 | Mao | |
| 6,524,756 B1 | 2/2003 | Wu | |
| 6,744,048 B2 | 6/2004 | Hosokawa et al. | |
| 6,934,060 B2 | 8/2005 | Psaltis | |
| 7,158,228 B2 * | 1/2007 | Psaltis et al. | 356/326 |
| 7,312,908 B2 * | 12/2007 | Takemori et al. | 359/32 |
| 2005/0007603 A1 * | 1/2005 | Arieli | G01J 9/02 356/601 |

(Continued)

OTHER PUBLICATIONS

International Preliminary Report on Patentability by International Bureau of WIPO for International Application PCT/US2010/051975 dated Apr. 11, 2012 (7 pages).

(Continued)

*Primary Examiner* — Jade R Chwasz
(74) *Attorney, Agent, or Firm* — McCarter & English, LLP; David R. Burns

(57) ABSTRACT

A volume holographic imaging system enables the projection of a two-dimensional (2D) slice of a four-dimensional (4D) object. The 4D source object is illuminated to emit or scatter an optical field. A holographic element having one or more recorded holograms receives and diffracts the optical field into a diffracted plane beam. A phase mask is encoded in one or more multiplexed holographic gratings of the holographic element using a spatial filter. A collector lens focuses the diffracted plane beam to a 2D slice of the 4D probing source object. The focused 2D slice is projected onto a 2D imaging plane. The holographic element may have multiple multiplexed holograms that are arranged to diffract light from a corresponding slice of the 4D probing source object to a non-overlapping region of the detector.

12 Claims, 6 Drawing Sheets

(56) References Cited

U.S. PATENT DOCUMENTS

| | | | |
|---|---|---|---|
| 2007/0013999 | A1 | 1/2007 | Marks et al. |
| 2007/0216906 | A1 | 9/2007 | Javidi et al. |
| 2009/0009668 | A1* | 1/2009 | Tan et al. ................... 349/1 |
| 2009/0073563 | A1 | 3/2009 | Betzig |
| 2010/0039918 | A1* | 2/2010 | Tanaka ................... 369/103 |
| 2012/0307326 | A1 | 12/2012 | Barbastathis et al. |
| 2012/0327489 | A1 | 12/2012 | Barbastathis et al. |
| 2012/0327492 | A1 | 12/2012 | Barbastathis et al. |

OTHER PUBLICATIONS

International Preliminary Report on Patentability by the International Bureau of WIPO for International Application PCT/US2010/051979 dated Apr. 11, 2012 (7 pages).

International Preliminary Report on Patentability by the International Bureau of WIPO for International Application PCT/US2010/051981 dated Apr. 11, 2012 (5 pages).

International Search Report and Written Opinion by International Searching Authority for International Application PCT/2010/51981 dated Dec. 13, 2010 (15 pages).

International Search Report and Written Opinion by International Searching Authority for International Application PCT/US2010/51975 mailed Dec. 13, 2010 (7 pages).

International Search Report and Written Opinion by International Searching Authority for International Application PCT/US2010/51979 dated Dec. 16, 2010 (13 pages).

Liu, Wenhai, George Barbastathis, and Demetri Psaltis. "Volume holographic hyperspectral imaging." Applied Optics, 43, No. 18, (Jun. 20, 2004): 3581-3599.

Luo, Y. "Novel Biomedical Imaging Systems", thesis submitted at University of Arizona. Jul. 18, 2008 (188 pages).

Luo, Y. et al., "Phase Contrast Volume Holographic Microscopy," presentation given at OSA Frontiers in Optics meeting (Oct. 11-14, 2009). (17 pages).

Luo, Y. et al., "Phase Contrast Volume-Holographic Microscope," in Frontiers in Optics 2009/Laser Science XXV/Fall 2009 OSA Optics & Photonics Technical Digest, OSA Technical Digest (CD) (Optical Society of America, 2009), paper FME7. (2 pages).

Luo, Yuan, et al. "Optimization of multiplexed holographic gratings in PQ-PMMA for spectral-spatial imaging filters." Optics letters 33, No. 6 (Mar. 15, 2008): 566-568.

Nagayama, Kuniaki. "Development of phase plates for electron microscopes and their biological application." European Biophysics Journal 37, No. 4 (Feb. 8, 2008): 345-358.

* cited by examiner

SYSTEM, METHOD AND APPARATUS FOR PHASE-CODED MULTI-PLANE MICROSCOPY

RELATED APPLICATIONS

This application claims priority under 35 U.S.C. §119(e) to U.S. Provisional Application Ser. No. 61/488,344, entitled "PHASE-CODED MULTI-PLANE MICROSCOPY" filed May 20, 2011, which is incorporated herein by reference in its entirety. This application is related to U.S. application Ser. No. 13/500,467, entitled "System, Method and Apparatus for Contrast Enhanced Multiplexing of Images" filed Apr. 5, 2012, U.S. application Ser. No. 13/500,461, entitled "System, Method and Apparatus for Contrast Enhanced Multiplexing of Images" filed Apr. 5, 2012, and U.S. application Ser. No. 13/500,464, entitled "System, Method and Apparatus for Wavelength-Coded Multi-Focal Microscopy" filed Apr. 5, 2012, each of which is incorporated herein by reference in its entirety.

STATEMENT OF GOVERNMENT INTEREST

This invention was made with government support under Grant No. CA134424 awarded by the National Institute of Health. The government has certain rights in this invention.

BACKGROUND

This disclosure relates generally to imaging systems, methods and apparatus, and more particularly to volume holographic imaging systems, methods and apparatus that obtain enhanced images from multiple depths within an object.

Microscopic imaging systems are beneficial for, among other things, biomedical and clinical applications. Volume holographic microscopy (VHM) has been developed as a microscopic instrument for spatial-spectral imaging of objects. Volume imaging systems have many useful applications, such as spectral and three spatial dimensional biological imaging (known as four-dimensional (4D) imaging), endoscope imaging systems, spectrometers, and the like.

In VHM, holographic gratings are superimposed in a volume recording material such that each grating obtains depth-resolved information from different depths within the object. Microscopic imaging systems incorporating VHM visualize features of the object at different focal planes. Each focal plane is projected to a different lateral location on a camera. Thus, the entire object volume is imaged slice-wise onto the camera without the need for electrical or mechanical scanning. However, many objects of interest are composed of weak phase features with poor contrast and are barely observable with VHM.

SUMMARY

Embodiments taught herein relate generally to imaging systems, methods and apparatus, and more particularly to volume holographic imaging systems, methods and apparatus that obtain enhanced images from multiple depths within an object.

According to one embodiment, a contrast-enhanced multiplexing imaging system as taught herein includes a volume hologram placed in the Fourier plane of the imaging system. To enhance the weak phase features within an object, a phase mask (also referred to herein as a phase contrast mask) may be encoded and multiplexed within the hologram along with signal information representing features of the object. The system may be expanded to include additional multiplexed holographic gratings within a single volume hologram and, hence, simultaneously image more planes (or slices) of the object onto non-overlapping locations on an imaging plane without scanning.

In one embodiment, a microscope as taught herein includes objective lenses, a holographic element with a phase mask encoded therein, imaging lenses, and an imaging plane, such as found in a digital camera. The lenses and holographic element together may project an image onto the imaging plane. The holographic element may be a volume hologram having one or more multiplexed hologram gratings. The multiplexed holographic gratings may be located at the Fourier plane of the microscope and are Bragg matched to a different focal plane within an object and simultaneously projected to a different lateral location on the imaging plane. In exemplary embodiments, the holographic element may be recorded in phenanthrenquinone doped poly methyl methacrylate (PMMA).

In another embodiment, a volume imaging system for imaging a source object as taught herein includes a holographic element, collector optics and a spatial filter. The holographic element may be capable of recording one or more holograms of the source object and is configured to receive and diffract an optical field emitted or scattered from the source object onto one or more diffracted plane beams. A spatial filter may be used to encode a phase mask into one or more multiplexed holographic gratings of the holographic element. The collector optics may be configured to focus each of the one or more diffracted plane beams to a two-dimensional slice of the source object, and simultaneously project the focused two-dimensional slice along an optical path onto an imaging plane.

In yet another embodiment, a method for imaging an object in four dimensions and real time includes receiving an emitted or scattered optical field of the object by a holographic element, which diffracts the received optical field into one or more diffracted plane beams. A phase mask may be encoded into one or more multiplexed holographic gratings of the holographic element. The diffracted plane beams may be focused into a two-dimensional slice of the object. The two-dimensional slice may be projected onto an imaging plane. When two or more slices of the object are projected, the slices may be simultaneously projected onto non-overlapping regions on the imaging plane. The diffraction may be based on one or more Bragg degeneracy properties.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings, in which.

DESCRIPTION OF EXEMPLARY EMBODIMENTS

In accordance with various embodiments taught herein are volume holographic imaging systems for obtaining contrast enhanced images from one or more depths within an object without scanning. The volume holographic imaging system enhances weak phase information of turbid objects by encoding the gratings of the volume hologram with phase information. The volume holographic imaging system may, for example, image the entire object volume in real time without electrical or mechanical scanning, and provide contrast-enhanced spatial and spectral information at all slices simultaneously. The volume holographic imaging system may include a microscope, spectroscope, endoscope, or other optical instrument, which may, for instance, be referred to as a single sideband edge enhancement volume holographic microscope.

An object placed in an embodiment of the imaging system results in two-depth resolved images separated by approximately 50 µm simultaneously displayed on an imaging plane. The imaging system may improve the phase contrast of the object by up to 89.0 times over conventional VHM methods.

Figure 1:
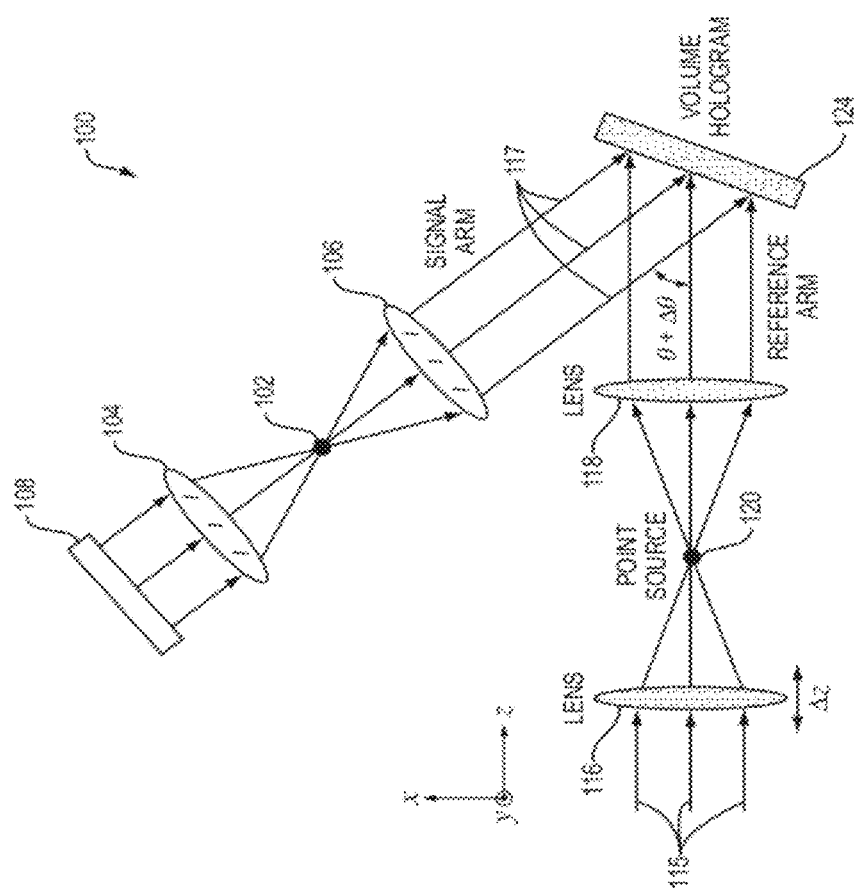
FIG. 1 depicts a diagrammatic view of one example of a recording system for multiplexing holographic gratings within a volume hologram in accordance with one embodiment.

FIG. 1 illustrates one embodiment of a recording system 100 for multiplexing holographic gratings, or recording multiple holographic gratings, within a transmissive volume hologram 124 using a source of electromagnetic radiation (not shown), such as a collimated laser beam. In addition to the volume hologram 124, the recording system 100 includes a filter 108 (also referred to herein as a spatial filter or a phase filter), such as a knife-edge or Zernike mask, and lenses 104, 106, 116 and 118.

A holographic grating may be created in the volume hologram 124 by recording the interference pattern of two mutually coherent light beams, which are generated by splitting the collimated laser beam into a reference arm 115 and a signal arm 117. The reference arm 115 determines the center of the object column (not shown) that will be visible by the hologram 124, while the direction of the signal arm 117 determines the location on the imaging plane (not shown) where the corresponding column will be projected.

A point source 120 along the reference arm 115 is formed by lens 116. The point source 120 provides the source of electromagnetic radiation along the reference arm 115 which interferes with the signal arm 117 to record a grating in the volume hologram 124. The inter-beam angle θ is the angle between signal arm 117 and reference arm 115 with respect to a surface of the volume hologram 124. The inter-beam angle θ may be changed by Δθ between different exposures of electromagnetic radiation from the collimated laser beam. More than one grating may be formed in the volume hologram 124 by varying the position of the point source 120 in the reference arm, for example, by moving lens 116 by a distance Δz between exposures while lens 118 stays fixed. In some embodiments, the nominal inter-beam angle θ in air is 68°, Δθ is 1°, and Δz is 50 µm, although it will be appreciated that these values are examples and that these or other embodiments may use different values.

The filter 108 in the signal arm 117 is imaged onto the pupil of the volume hologram 124 during exposure for encoding phase information into the holographic grating. Relay lenses 104 and 106 may be used in the signal arm 117 to relay the image of the filter 108 onto the hologram and to provide constant irradiance at the volume hologram.

In one embodiment, the hologram exposures may be varied to increase the efficiency of gratings that select positions deeper within the object. In some embodiments, the recording medium of volume hologram 124 is phenanthrenquinone doped poly methyl methacrylate (PQ-doped PMMA) and the collimated laser beam is an argon-ion ($Ar^+$) laser operating at a wavelength of approximately 488 nm.

Other materials may be used as a recording medium. By way of example, Aprilis ULSH-500, $LiNbO_3$ including Zn-doped $LiNbO_3$ and DuPont photopolymers may be used as recording material. (See Atsushi Sato et al, Applied Optics vol. 42, pp. 778-784, (2003), Yasuo Tomita et al, Optics Express vol. 14, pp. 5773-5778 (2006), and Raymond K. Kostuk et al, Applied Optics vol. 38, pp. 1357-1363 (1999)). Those skilled in the art will appreciate that each material has a range of sensitivity for recording and that another source of electromagnetic radiation with appropriate wavelength in the corresponding range of sensitivity may be used for recording. With proper fabrication, the multiplexed holographic gratings within a volume hologram can operate at wavelengths longer than the recording wavelength of signal arm 117 and reference arm 115. (See Y. Luo, P. J. Gelsinger, J. K. Barton, G. Barbastathis, and R. K. Kostuk, Opt. Lett. Vol. 33, 566-568 (2008) which is incorporated by reference herein in its entirety). In the same embodiment, the diffraction efficiencies of the two multiplexed gratings are approximately 40% and approximately 35%, the thickness of the PQ-doped PMMA recording material is approximately 1.5 mm, and the numerical apertures of lens 116 and lens 118 are 0.65 and 0.55, respectively.

Figure 2:
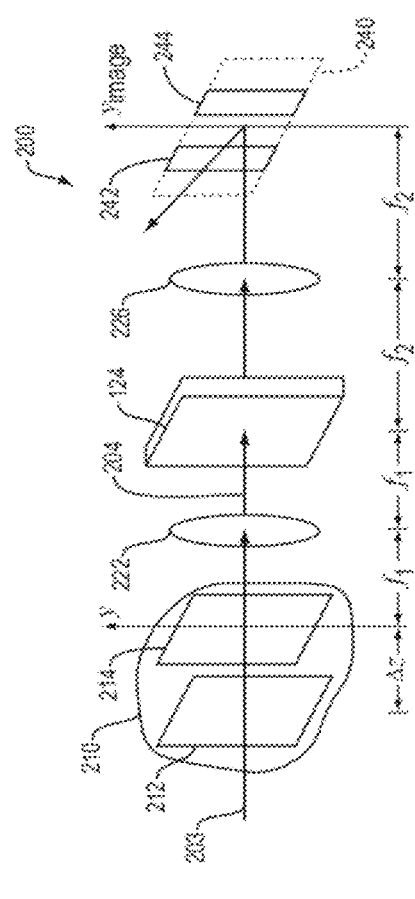
FIG. 2 depicts a diagrammatic view of one example of a volume holographic microscope in accordance with one embodiment.

FIG. 2 illustrates one example of a portion of an imaging system 200, according to one embodiment. FIG. 2 shows a reference arm portion of the system 200. A signal arm portion, such as described above with respect to FIG. 1, may be included in the system 200, but for clarity is not shown in FIG. 2. The system 200 includes an objective lens 222, the multiplexed volume hologram 124, a collector lens 226, and an imaging plane 240. An electromagnetic field 203, which is part of the reference arm, is directed toward an object 210. The objective lens 222 acts to collimate the portions of the electromagnetic field 203 emitted or scattered from the object 210. The collimated field 204 passes through the multiplexed volume hologram 124 and is collected by the collector lens 226, which projects images to the imaging plane 240. In one embodiment, the multiplexed volume hologram 124 has at least two multiplexed gratings. Each grating is Bragg matched to different two-dimensional (2D) slices (depths) of the object 210 taken along the y-axis at first focal plane 212 and second focal plane 214. Thus, images of focal planes 212 and 214 are simultaneously projected by the system 200 to non-overlapping lateral locations, 242 and 244, respectively, on the image plane 240. The gratings are diffractive elements consisting of a periodic phase or absorption perturbation throughout the entire volume of the holographic element. When a beam of incident light satisfies the Bragg phase matching condition it is diffracted by the periodic perturbation. Those skilled in the art will appreciate that Bragg matched refers to satisfying the Bragg matching condition, which occurs when the diffraction efficiency of a transmissive volume hologram is maximized. Since, as described above with respect to FIG. 1, the spatial phase mask is encoded in each holographic grating in the volume holograph 124, the image of each focal plane 212, 214 can be contrast-enhanced without the need of scanning.

In one embodiment, the multiplexed volume hologram 124 is located at the Fourier plane of the objective lens 222. The imaging plane 240 is located at the Fourier plane of the collector lens 226. The distance $f_1$ is the distance between the second focal plane 214 and the objective lens 222. The grating within multiplexed volume hologram 124 that is Bragg matched to the second focal plane 214 is located a distance of $f_1$ from the objective lens 222.

In one embodiment, the source of electromagnetic radiation may be a plurality of coherent light sources, a broadband light source such as a dispersed white-light source with chromatic foci, a plurality of light emitting diodes or the like. The imaging plane 240 may, for example, be part of a charge couple device (CCD) or camera which may be connected to or part of a computer, projector, or other such device.

Figure 3:
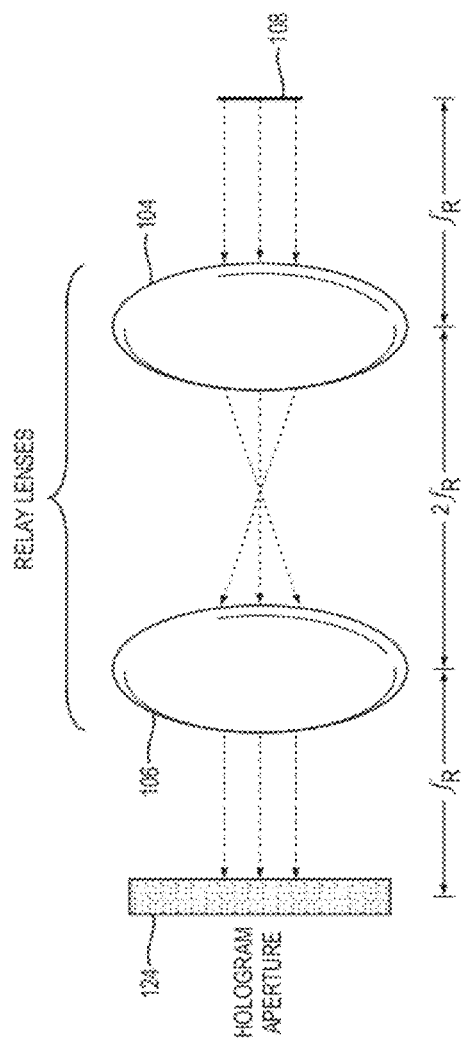
FIG. 3 depicts a diagrammatic view of one example of a 4-f telecentric relay system of the recording system of FIG. 1 in accordance with one embodiment.

FIG. 3 depicts one embodiment of a relay system including lenses 104 and 106 of the recording system 100 of FIG. 1. The relay system is a 4-f telecentric system. The distance $f_R$ is the distance between the volume hologram 124 and lens 106. The distance between lenses 104 and 106 is two times the length of distance $f_R$. The distance $f_R$ is also the distance between lens 104 and the filter 108. The filter 108 may, for example, eliminate all or nearly all components to one side of a DC component in the spatial frequency domain to achieve a single sideband edge enhancement of the images, as described herein. The one-dimensional transmittance of the filter 108 at the Fourier space is given in Equation 1 as:

$$t_{filter}(f_y) = 1 + sgn(f_y) \quad (1)$$

where sgn is the signum function and $sgn(f_y)=1$ at $f_y>0$; $sgn(f_y)=0$ at $f_y=0$; $sgn(f_y)=-1$ at $f_y<0$. For a weak phase object, $exp[j\phi(y)] \approx 1 + j\phi(y)$ where $\phi(y)$ is the phase in the y-direction. When a weak phase object is placed in the exemplary imaging system, the resultant image, centered at the appropriate transverse location on the image plane, can be written in Equation 2 as:

$$I_i = |[1 + j\phi(y)] * FT[1 + sgn(f_y)]|^2 \propto \phi(y) * \frac{1}{\pi y} \quad (2)$$

where $I_i$ is the irradiance distribution of the image and FT is the Fourier transform. The Hilbert transform reduces the DC component and significantly enhances the detection sensitivity of phase jumps or edges. This enhancement is observed in parallel at all the multiplexed focal planes (slice-wise images from multiple depths within object 210) of the imaging system 200.

Figure 4:
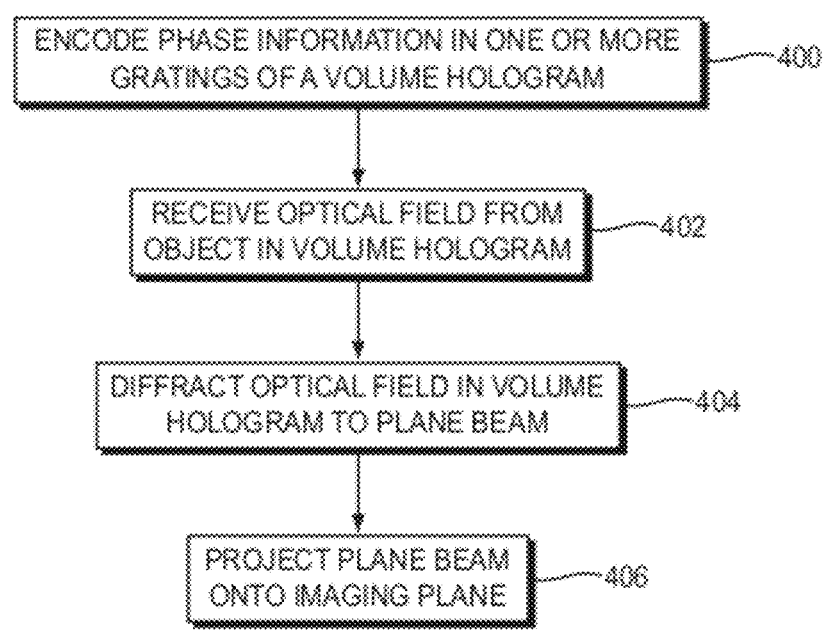
FIG. 4 is a flow diagram depicting an illustrative method for practicing an embodiment of a volume holographic imaging system as taught herein.

FIG. 4 depicts one embodiment of a method of imaging an object defined in four-dimensional space and real time using a volume holographic imaging system, such as the system 200 described above with respect to FIG. 2. At step 400, phase information is encoded in one or more gratings of the volume hologram 124 of FIG. 2. In step 402, multiplexed volume hologram 124 receives an optical field that has been scattered or emitted from the object 210 of interest. In some embodiments, the scattered or emitted optical field may be processed by one or more optical elements, such as the objective lens 222, to focus the received optical field onto the volume hologram 124. In step 404, a grating within the multiplexed volume hologram 124 diffracts the received optical field into one or more plane beams. The plane beam is a holographic representation of a 2-D slice of the object 210 taken at a plane within the object 210 that is Bragg matched to the grating in the volume hologram 124. In step 406, the plane beam is projected onto an imaging plane 240. In some embodiments, the volume hologram 124 has two or more gratings recorded therein. In the same embodiment, the number of 2-D images that are simultaneously projected onto the imaging plane 240 in a non-overlapping manner corresponding to the number of gratings. Advantageously, the multiple images are simultaneously projected to non-overlapping portions of the imaging plane.

Figure 6:
FIG. 6 is an image of the sample of FIG. 5 obtained by a volume holographic microscopy in accordance with one embodiment.
Figure 5:
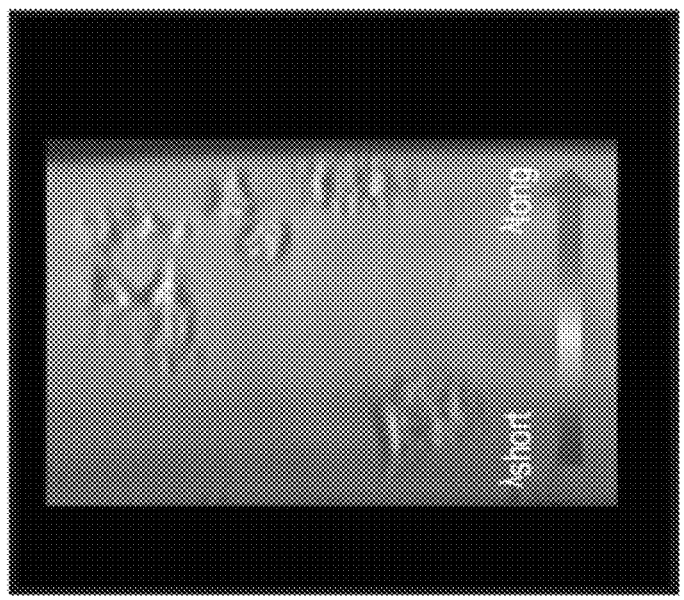
FIG. 5 is an image of a human endothelial cell sample seeded on a 2D substrate obtained by a conventional volume holographic microscopy.

FIG. 5 is an image of a human endothelial cell sample seeded on a 2D substrate obtained by a conventional volume holographic microscopy. FIG. 6 is an image of the sample of FIG. 5 obtained by a volume holographic microscopy in accordance with one embodiment. Advantageously, the exemplary imaging systems taught herein enhances the contrast of structures, such as in the turbid media shown in FIGS. 5 and 6. The resulting images, such as shown in FIG. 6, are contrast-enhanced, two-dimensional and observable in real time. Furthermore, exemplary imaging systems as taught herein can be applied to both fluorescence and non-fluorescence imaging and collect both spectral and spatial information of an object without mechanically scanning in the X-Y-Z directions for a given field of view.

Figure 7B:
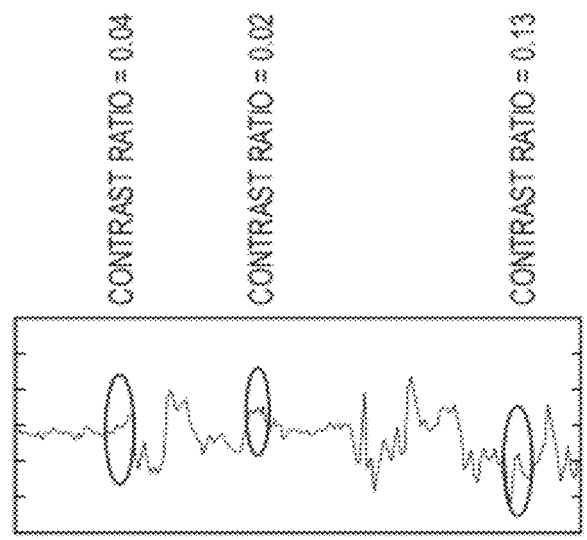
FIG. 7B is a graph of the contrast ratio of different features of the cancer cells of FIG. 7A using a conventional VHIS.
Figure 7A:
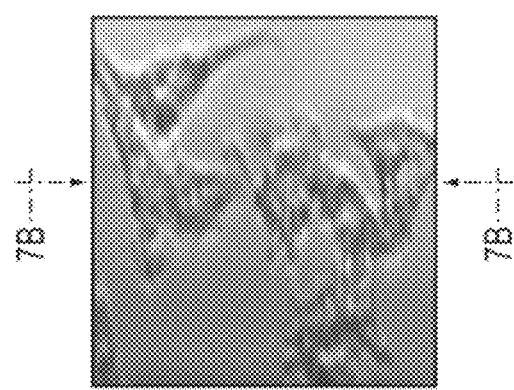
FIG. 7A is an image of cancer cells obtained using a conventional volume holographic imaging system.

FIG. 7A is an image of cancer cells obtained using a conventional VHIS, i.e., one in which no encoded spatial filters in the volume hologram are used during the recording process. A volume hologram without any encoded spatial filters is located in the Fourier plane of the imaging system. FIG. 7B is a graph of the contrast ratio of different features of the cancer cells along a cross-section 7B-7B of FIG. 7A using the conventional VHIS.

Figure 8B:
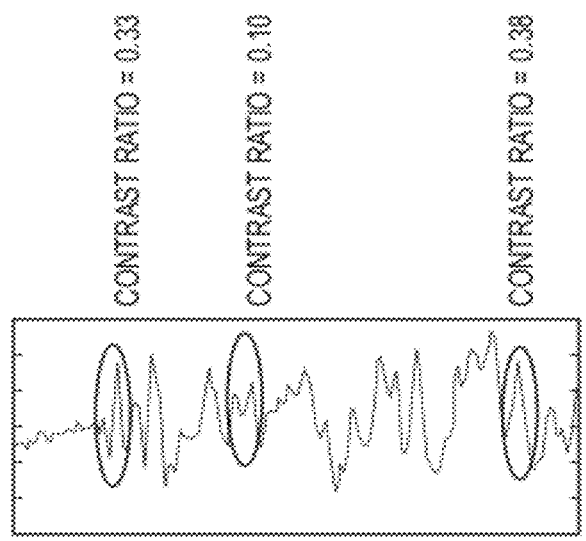
FIG. 8B is a graph of the contrast ratio of different features of the cancer cells of FIG. 8A using a spatial filter encoded VHIS in accordance with one embodiment.
Figure 8A:
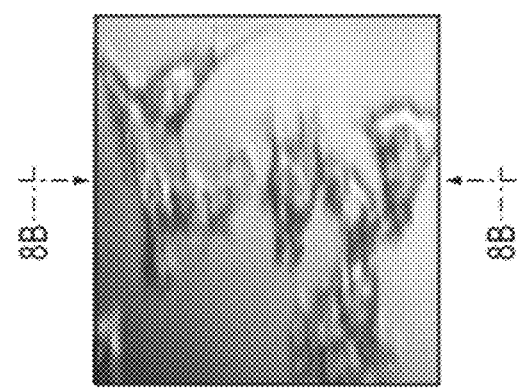
FIG. 8A is an image of the cancer cells of FIG. 7A obtained by a volume holographic imaging system in accordance with one embodiment.

FIG. 8A is another image of the cancer cells of FIG. 7, except the image of FIG. 8A is obtained using a spatial filter (e.g., a knife edge filter) encoded volume hologram imaging system according to one embodiment. The spatial-filter encoded volume hologram may be located in the Fourier plane of the imaging system so that weak phase features within an object are observable on the image plane. FIG. 8B is a graph of one example of the contrast ratio of different features of the cancer cells along a cross-section 8B-8B of FIG. 8A using the spatial filter encoded VHIS.

In addition to the benefit of a more compact system implementation, embedding (recording) the phase contrast mask in the volume holographic pupil provides an advantage in terms of image contrast. In this manner, the optical field from the object interacts with the object throughout the entire volume (3D) of the volume holographic pupil, as opposed to a traditional phase contrast mask which is a thin (2D) element. In the 3D element, filtering is stronger; for example, scattered and out-of focus light is more difficult to match the Bragg condition throughout the spatial spectrum of the phase-contrast mask, and rejected, whereas the desired wavefront coming from object features is perfectly matched to the spatial spectrum of the phase-contrast mask and produces significant signal on the CCD camera. This results in better rejection of scattered and out-of focus light.

Although the teachings herein have been described with reference to exemplary embodiments and implementations thereof, the disclosed methods, systems and apparatus are not limited to such exemplary embodiments/implementations. Rather, as will be readily apparent to persons skilled in the art from the description taught herein, the disclosed methods, systems and apparatus are susceptible to modifications, alterations and enhancements without departing from the scope hereof. Accordingly, all such modifications, alterations and enhancements within the scope hereof are encompassed herein.

What is claimed is:

1. A volume imaging system for imaging a source object comprising:
    a transmissive holographic element having one or more multiplexed holographic gratings for imaging one or more optical fields of a source object, each of the multiplexed holographic gratings having a phase mask recorded therein, and each of the multiplexed holographic gratings configured to receive and selectively diffract an optical field emitted or scattered from a respective two-dimensional slice of the source object into a corresponding diffracted plane beam; and
    collector optics configured to focus each diffracted plane beam to form a phase contrast image of the corresponding two-dimensional slice of the source object at an imaging plane.

2. The volume imaging system of claim 1, wherein the transmissive holographic element diffracts the optical field emitted or scattered from the two-dimensional slices of the source object based on one or more Bragg properties.

3. The volume imaging system of claim 1, wherein the volume imaging system is configured to simultaneously diffract an optical field from each of the two-dimensional slices of the source object to a non-overlapping region of the imaging plane.

4. The volume imaging system of claim 1, wherein the source object is defined in four dimensional space and real time.

5. The volume imaging system of claim 1, wherein the recorded phase mask for at least one of the multiplexed holographic gratings encodes an image of a Zernike filter.

6. The volume imaging system of claim 1, wherein the recorded phase mask for at least one of the multiplexed holographic gratings encodes an image of a knife edge filter.

7. The volume imaging system of claim 1, further comprising a filter whose image is recorded as the phase mask during formation of each of the multiplexed holographic gratings in a volume recording medium to form the transmissive holographic element, the filter being disposed in axial relation to the transmissive holographic element.

8. The volume imaging system of claim 7, further comprising a 4-f telecentric relay system interposed between the filter and the transmissive holographic element.

9. The volume imaging system of claim 1, wherein the one or more multiplexed holographic gratings are recorded in phenanthrenquinone doped poly methyl methacrylate.

10. The volume imaging system of claim 1, wherein the phase mask of each multiplexed holographic grating eliminates the DC component in the spatial frequency domain of the corresponding phase-contrast image of the two-dimensional slice of the source object.

11. The volume imaging system of claim 1, further comprising an objective lens positioned between the source object and the transmissive holographic element and configured to receive and collimate electromagnetic radiation emitted or scattered from the source object.

12. The volume imaging system of claim 11, wherein the volume imaging system is a microscope.

* * * * *